March 8, 1966   K. D. COUGHREN   3,238,797
SLIP CAM ARRANGEMENT
Filed Jan. 3, 1964   2 Sheets-Sheet 1
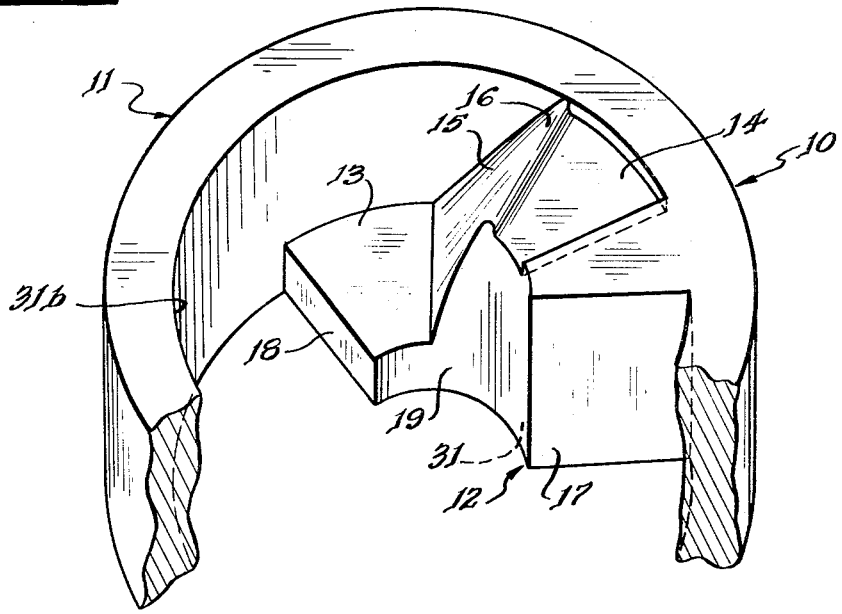
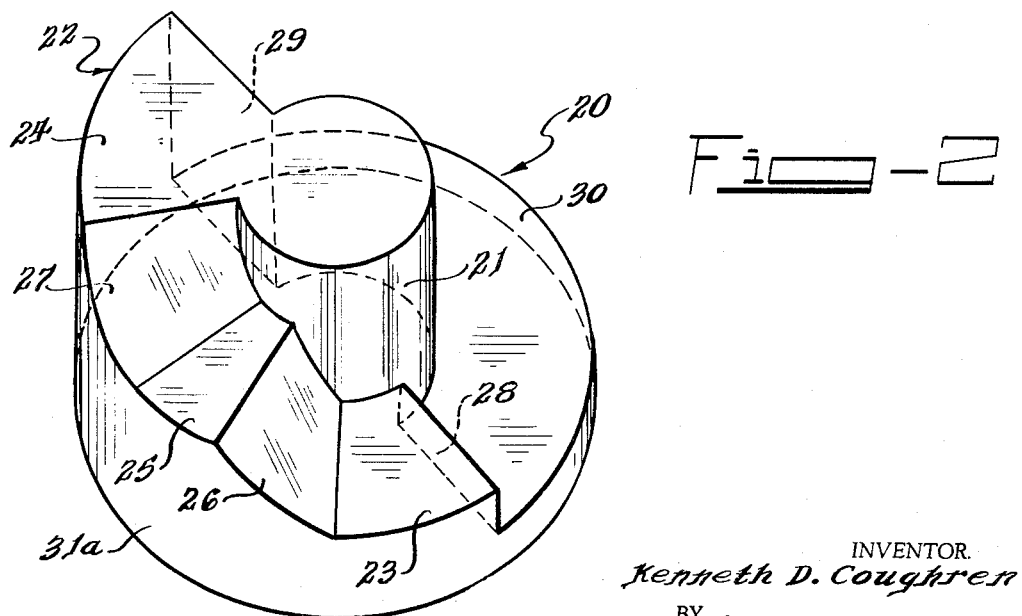
INVENTOR.
Kenneth D. Coughren
BY Roland A. Anderson
Attorney

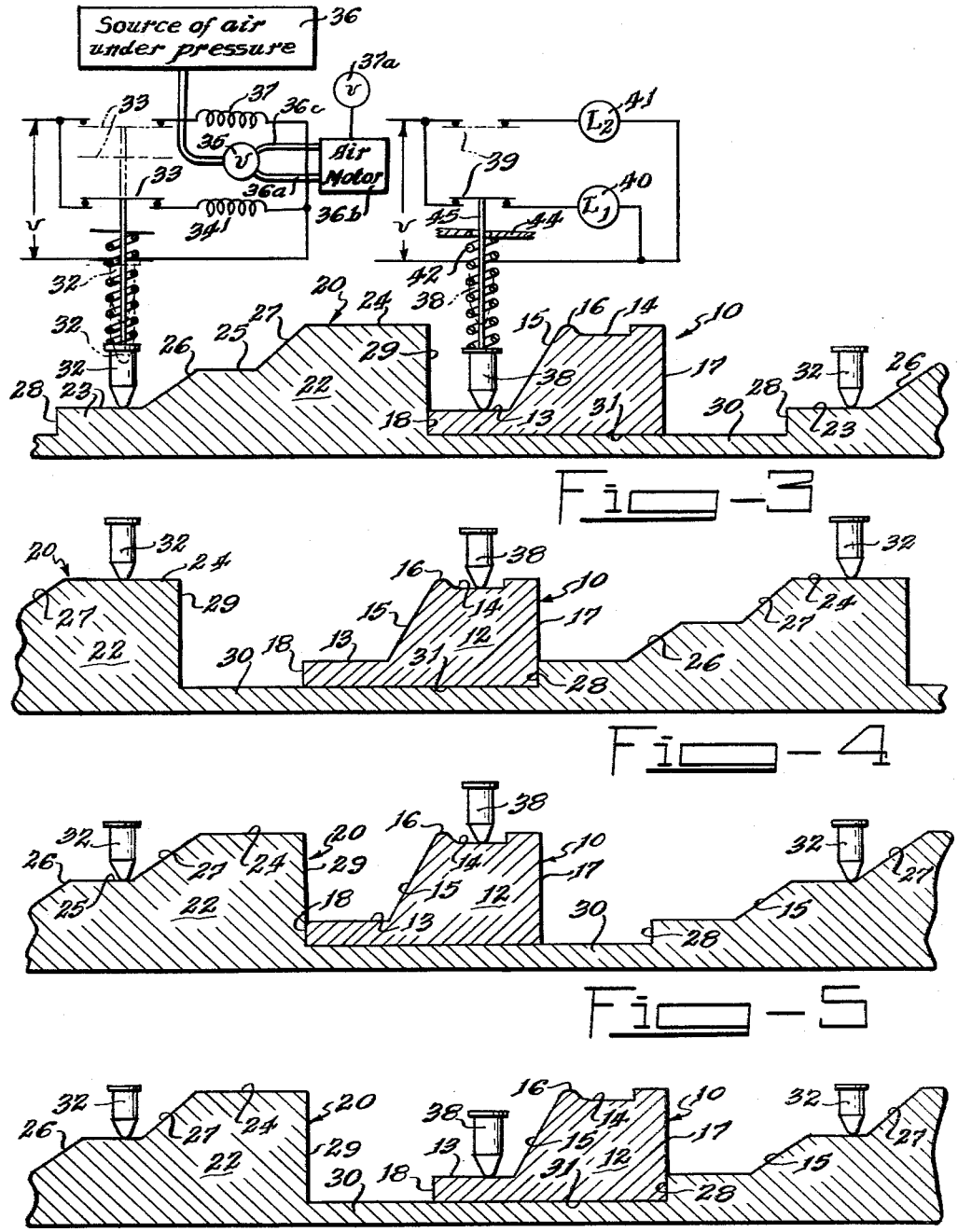

3,238,797
SLIP CAM ARRANGEMENT
Kenneth D. Coughren, Richland, Wash., assignor to the United States of America as represented by the United States Atomic Energy Commission
Filed Jan. 3, 1964, Ser. No. 335,698
2 Claims. (Cl. 74—55)

The invention described herein was made in the course of, or under, a contract with the U.S. Atomic Energy Commission.

This invention relates to an indicator for use with a system having two modes of operation and a neutral condition of inaction. More specifically, the invention relates to an arrangement and construction of cams that are to move with one another with a certain amount of lost motion between them.

In the drawings:

FIG. 1 is a perspective view, partially broken away, of a cam forming an important part of the present invention;

FIG. 2 is a perspective of another cam adapted to operate with the cam of FIG. 1; and FIGS. 3–6 are schematic developed views showing how the cams operate in various positions according to the present invention.

As shown in FIG. 1, a cam 10 comprises a circular rim 11 and a portion 12 projecting radially inwardly therefrom. Portion 12 has a low level surface 13, a high level surface 14, an inclined surface 15 extending therebetween, and a protuberance 16 which forms an important part of the present invention. The protuberance 16 extends radially along the edge of the high level surface 14 adjacent the inclined surface 15. The portion 12 of the cam 10 also has radial shoulders 17 and 18 and an arcuate radially inner end 19.

As shown in FIG. 2, a cam 20 has a hub 21 extending the height of the cam and a portion 22 extending about one side of the hub and radially outward therefrom. The portion 22 has a low level surface 23, a high level surface 24, an intermediate level surface 25 lying therebetween, an inclined surface 26 extending between surfaces 23 and 25, and an inclined surface 27 extending between surfaces 24 and 25. At the ends the portion 22 has radial shoulders 28 and 29. The cam 20 also has a base 30 which is at a lower level than the surfaces 23, 24, and 25 and extends about the hub 21 between the shoulders 28 and on the side away from the portion 22.

The cams 10 and 20 are adapted to be assembled so that the hub 21 of cam 20 rotatively engages arcuate end 19 of cam 10, an under side 31 of portion 12 of cam 10 slidably seats on base 30 of cam 20, and a peripheral surface 31a of portion 22 of cam 20 rotatively engages inner surface 31b of rim 11 of cam 10. When the cams 10 and 20 are assembled as just described, angular movement of one cam with respect to the other is possible, because the angle between the shoulders 17 and 18 of cam 10 measured by way of the portion 12 is less than the angle between the shoulders 28 and 29 of the cam 20 measured by way of the base 30.

Reference is now made to FIGS. 3–6, in which the assembled cams 10 and 20 are shown developed. Such views are obtainable by developing or opening up a circular section of the assembled cams 10 and 20 taken radially inward of the rim 11 of cam 10 and radially outward of hub 21 of cam 20.

As is evident from FIGS. 3–6, the angular spacing of shoulders 17 and 18 of cam 10 is less than the angular spacing of shoulders 28 and 29 of cam 20, and so the cam 20 can move angularly with respect to cam 10, as shown by the different relative positions of cams 10 and 20 shown in these figures.

The cam 20 acts through a follower 32 to place a switch 33 in three positions. When follower 32 engages low level surface 23 of cam 20, as shown in FIG. 3, the switch 33 is positioned as shown in full line in this figure to close a circuit through winding 34 bringing a valve 35 to a first operative position in which a source 36 of air under pressure is connected by a line 36a with an air motor 36b, which may comprise a cylinder and piston, and a line 36c is vented. When as shown in FIG. 4, the follower 32 engages high level surface 24 of cam 20, the switch 33 is placed in the upper broken-line position of FIG. 3 to close a circuit through winding 37 bringing valve 35 to a second operative position in which line 36a is vented and the air source 36 is connected with air motor 36b by line 36c. The air motor 36b controls a valve 37a which has two operative positions whose purpose will be described presently. The valve 37a moves to one operative position when motor 36b is supplied by line 36a. Valve 37a moves to its other operative position when motor 36b is supplied by line 36c. When as shown in FIGS. 5 and 6, the follower 32 engages intermediate level surface 25 of cam 20, the switch 33 is placed in the lower broken-line position of FIG. 3, with the result that neither winding 34 nor winding 37 is energized, valve 35 is moved by a spring (not shown) to a neutral position in which both line 36a and line 36c are closed to the air source 36, the motor 36b is not driven, and the valve 37a keeps its position.

While the cam 20 is occupying the three positions needed to make the follower 32 engage the level surface 24, 25, or 26 as aforesaid, the cam 10 occupies only two positions: that of FIGS. 3 and 6, in which a follower 38 engages low level surface 13 of cam 10, and that of FIGS. 4 and 5, in which the follower 38 engages high level surface 14 of cam 10. When the follower 38 engages cam surface 13, a switch 39 is placed as shown in full line in FIG. 3 to light an indicator lamp 40 by closing a circuit therethrough. When follower 38 engages cam surface 14, the switch 39 is placed as shown in broken line in FIG. 3 to light a lamp 41 by closing a circuit therethrough. Indicator lamp 40 is lit when the valve 37a has been moved to a first operative position, because coil 34 being energized has caused valve 35 to connect the air source 36 with the air motor 36b through the line 36a. This is due to the fact that, as shown in FIG. 3, cam 20 has been moved to the right and has moved cam 10 to the right because of engagement of shoulders 18 and 29 of cams 10 and 20. Indicator lamp 41 is lit when the valve 37a has been moved to a second operative position, because coil 37 being energized has caused valve 35 to connect air source 36 with air motor 36b through the line 36c. This is due to the fact that, as shown in FIG. 4, cam 20 has been moved to the left and has moved cam 10 to the left by virtue of engagement of shoulders 17 and 28 of cams 10 and 20.

When winding 34 is no longer energized by virtue of leftward movement of cam 20 from the position of FIG. 3 to that of FIG. 6, lamp 40 stays lit indicating previous energization of winding 34, because such leftward movement of cam 20 is without effect on cam 10, since shoulders 28 and 29 of cam 20 are farther apart than shoulders 17 and 18 of cam 10.

When cam 20 is moved still farther to the left from the position of FIG. 6 to that of FIG. 4, engagement of shoulders 17 and 28 moves cam 10 to the left. The result is that follower 38 moves to the high level surface 14 of cam 10 and lamp 41, instead of lamp 40, is lit. This is an indication of the movement of the valve 37a to its second operative position, which movement is produced by energization of winding 37 due to shifting of follower 32 to the high level surface 24 of cam 20.

When winding 37 is no longer energized by virtue of rightward movement of cam 20 from the position of FIG. 4 to that of FIG. 5, lamp 41 stays lit indicating previous energization of winding 37, because such rightward movement of cam 20 is without effect on cam 10, since shoulders 28 and 29 of cam 20 are farther apart than shoulders 17 and 18 of cam 10.

When cam 20 is moved still farther to the right from the position of FIG. 5 to that of FIG. 3, engagement of shoulders 18 and 29 moves cam 10 to the right. The result is that follower 38 moves to the low level surface 13 of cam 10, and lamp 40, instead of lamp 41, is lit. This is an indication of the movement of valve 37a to its first operative position, which movement is produced by energization of winding 34 due to shifting of follower 32 to the low level surface 23 of cam 20.

Follower 38 is kept in contact with cam 10 by a coil spring 42 having one end acting against the follower and the other end acting against a stop 44. A rod 45 connects the follower 38 and the switch 39 and projects through a hole in the stop 44. In spite of lubrication between the cams 10 and 20, there is a possibility that friction between the cams, due in part to the pressure between the cams caused by the spring 42, will cause cam 10 to follow cam 20 in the latter's movement from the position of FIG. 4 to that of FIG. 5.

To maintain cam 10 in the same position as shown in FIGS. 4 and 5, in spite of rightward movement of cam 20, I have provided cam 10 with protuberance 16 at the edge of the high level surface 14 adjacent the inclined surface 15. If the cam 10 tends to move to the right from the position of FIG. 4 due to the frictional drag on the cam 20 as it moves from the position of FIG. 4 to that of FIG. 5, such rightward movement is very limited and effectively prevented by engagement between the follower 38 with the protuberance 16. The force of the spring 42 against the follower 38 prevents the follower from riding over the protuberance 16. Thus, the cam 10 is kept in the position of FIGS. 4 and 5, the switch 39 is kept in its upper position, and the lamp 41 is kept lit as an indication that the winding 37 had most recently been energized to position the valve 37a in its second operative position, in spite of the fact that the cam 20 had moved to the position of FIG. 5 in which neither winding 37 nor winding 34 was energized. Without protuberance 16, cam 10 might readily follow cam 20 enough because of friction to bring the follower 38 to the inclined surface 15 of cam 10, whereupon the cam 10 would certainly move to the right because of the pressure of the follower 38 on the inclined surface 15 due to the spring 42.

When the cam 20 is being moved leftward from the position of FIG. 3 to that of FIG. 6, any leftward movement of the cam 10 prior to contact between the shoulders 17 and 28 is limited and effectively prevented by engagement of the follower 38 with the inclined surface 15.

The invention of the present application can be used wherever it is desirable or mandatory to know which of two conditions of operation was in effect and to start the new condition of operation from neutral or a condition of inoperation.

Consider a nuclear reactor through which the same body of coolant is moved in a closed circuit and into which a separate body of purging liquid is to be introduced for cleaning the reactor without mixing with the body of coolant liquid. The valve 37a may pass coolant liquid in one of its operative positions and purging liquid in the other operative position. Except when operating the air motor 36b to shift the valve 37a, the valve 35 should be in its neutral position in which both line 36a and line 36c are cut off from the air source 36. Otherwise an undesirable air leakage occurs. It is necessary to know whether the valve 37a is in the "coolant" position or the "purging" position, and this is shown by the indicator lamps 40 and 41.

It is understood that the invention is not to be limited by the details given herein but that it may be modified within the scope of the appended claims.

The embodiments of the invention in which an exclusive property or privilege is claimed are defined as follows:

1. An assembly comprising
   (1) a first cam having (a) three spaced level surfaces of different heights, (b) two inclined surfaces extending between the level portions, and (c) two spaced shoulders;
   (2) a second cam slidably seated on the first cam and having (a) two spaced level surfaces of different heights, (b) an inclined surface extending between the level surfaces, and (c) two spaced shoulders one engageable with one shoulder of the first cam upon movement of the latter in one direction, the other engageable with the other shoulder of the first cam upon movement of the latter in the opposite direction, the spacing of the shoulders of the first cam being different from that of the second cam, whereby the first cam has some movement in both of its aforesaid directions independently of the second cam; and
   (3) a follower engageable with the level and inclined portions of the second cam and resiliently urging the second cam in such a direction as to keep the second cam seated on the first cam;
      the second cam having a protuberance at the edge of the higher level surface adjacent the inclined surface, said protuberance cooperating with the follower upon engagement therewith to prevent the second cam from following the first cam in its movement merely by virtue of friction due to the seating of the second cam on the first cam.

2. An assembly comprising
   (A) a first rotary cam comprising (1) a circular hub extending for the height of the cam, (2) a portion extending outwardly from the hub and about one side thereof and having (a) three spaced level surfaces of successively increasing height, (b) two inclined surfaces extending between the level surfaces, and (c) two shoulders extending radially outward from the hub at the end of the said portion, and (3) a base extending around the hub from one shoulder to the other on the side opposite the said portion between the shoulders at a height below all the level surfaces;
   (B) a second rotary cam comprising (1) a circular rim rotatively engaging the periphery of the said portion of the first cam, and (2) a portion extending radially inwardly from the rim and having (a) an arcuate inner end rotatively engaging the hub of the first cam, (b) two spaced level surfaces of different height, (c) an inclined surface extending therebetween, (d) an underside slidably engaging the base of the first cam, and (e) two shoulders extending radially inwardly from the rim at the ends of the said portion of the second cam and being engageable with the shoulders of the first cam, the angular spacing of the shoulders of the first cam measured over the base thereof being greater than the angular spacing of the shoulders of the second cam, whereby the first cam has some rotary movement in both directions independently of the second cam; and (C) a follower engageable with the level and inclined surfaces of the second cam and resiliently urging the second cam axially in such a direction as to keep the underside of the said portion of the second cam seated on the base of the first cam;

the second cam having a protuberance at the edge of the higher level surface of the second cam adjacent the inclined surface thereof, said protuberance cooperating with the follower upon engagement therewith to prevent the second cam from following the first cam in its rotary movement merely by virtue of friction due to the second cam on the first cam.

No references cited.

BROUGHTON G. DURHAM, *Primary Examiner.*

FRELING E. BAKER, *Examiner.*